United States Patent [19]
Vico

[11] Patent Number: 5,210,995
[45] Date of Patent: May 18, 1993

[54] MACHINE DESIGNED FOR PACKAGING OBJECTS, PARTICULARLY CONTAINERS

[75] Inventor: Francisco A. Vico, Barcelona, Spain

[73] Assignee: Doboy Iberica S.A., Valencia, Spain

[21] Appl. No.: 723,582

[22] Filed: Jul. 1, 1991

[30] Foreign Application Priority Data

Jul. 3, 1990 [ES] Spain ................................ 9001829

[51] Int. Cl.⁵ ..................... B65B 11/50; B65B 35/54; B65B 41/16; B65B 51/10
[52] U.S. Cl. .......................................... 53/591; 53/553; 53/557
[58] Field of Search .................. 53/591, 553, 548, 543, 53/544, 445, 443, 448

[56] References Cited

U.S. PATENT DOCUMENTS

| | | | |
|---|---|---|---|
| 3,481,107 | 12/1969 | Andblad et al. | 53/543 |
| 3,611,656 | 10/1971 | Chidsey, Jr. | 53/591 X |
| 3,807,117 | 4/1974 | Abrams | 53/553 X |
| 4,214,419 | 7/1980 | Allen et al. | 53/553 X |
| 4,771,589 | 9/1988 | Mueller et al. | 53/543 X |

*Primary Examiner*—James F. Coan
*Attorney, Agent, or Firm*—Lackenbach Siegel Marzullo & Aronson

[57] ABSTRACT

A machine for packaging objects, particularly containers comprising a frame having a conveyor belt and a pair of convergent tracks leading to a distributing means, at least two containers to be joined in a package, and means moving said containers towards a third track with vertically disposed reels feeding laminar material to opposite sides of the containers, and through cutting and thermowelding means which form the package for inserting it in the heating tunnel.

9 Claims, 2 Drawing Sheets

MACHINE DESIGNED FOR PACKAGING OBJECTS, PARTICULARLY CONTAINERS

The present invention relates to improvements in machines designed for packaging objects, particularly containers.

More particularly, the present invention relates to machines designed for packaging at least two objects, particularly containers, using plastic laminar material strips, preferably from PVC, polyethylene or any other material which is thermoretractable and susceptible of being thermowelded for marketing and selling the packaged objects wherein at least one of them is for promotional purposes.

Machines for the construction of tubular strips including a welding line in the general sense providing two equal or different cross-sectioned unit housings for the objects or containers to be packaged are already known in the prior art.

A first stage is required however by the present prior art techniques wherein the production of such strip segments with incorporated welding providing two cavities is followed by a second stage performed at a center quite independent from the previous first stage wherein there is manually placed a double strip on the two objects to be packaged, with both strips and objects to a heating tunnel. This known technique has many disadvantages and the production costs are very high. Such known technique has too many disadvantages to be described herein, and all of these disadvantages are overcome by the present invention which deals with a machine designed for the ongoing manufacturing of strips or collars for joining and/or packaging several objects, particularly containers. Such novel invention enables one to perform said strip manufacturing and location at different formats and directly on the objects to be joined, without any unit limitation.

Thus, the invention comprises means for the continuous feeding of objects embodying an endless conveyor belt combined with concurrent tracks and synchronized means designed for the selection of the packaging, components of the container units, and moving same towards a third track longitudinally extending between two vertically disposed reels which feed two associated PVC strips. The invention employs conveying chains including cutting and thermowelding means, which are interchangeable to allow a change of the packaging, product configuration or number.

To make the present description more understandable, the drawing illustrates an embodiment of the present invention and is shown therein and is shown therein only way of example.

Figure 1:
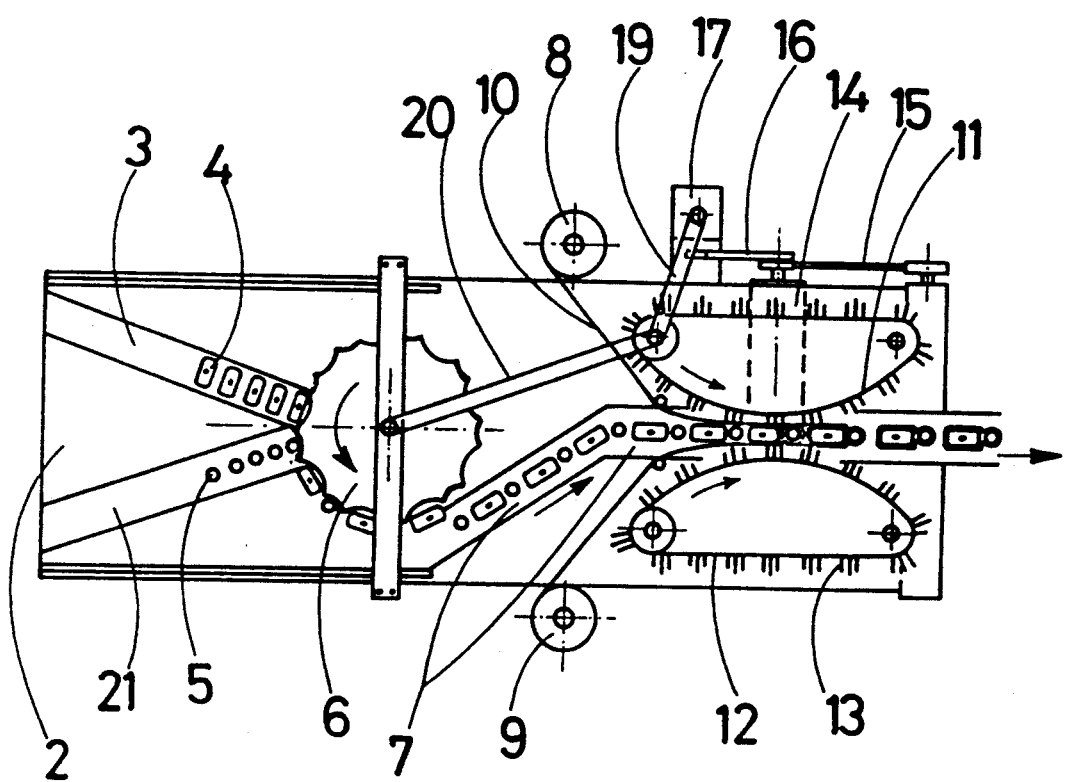
FIG. 1 is a top plan view of the machine made according to the present invention.
Figure 2:
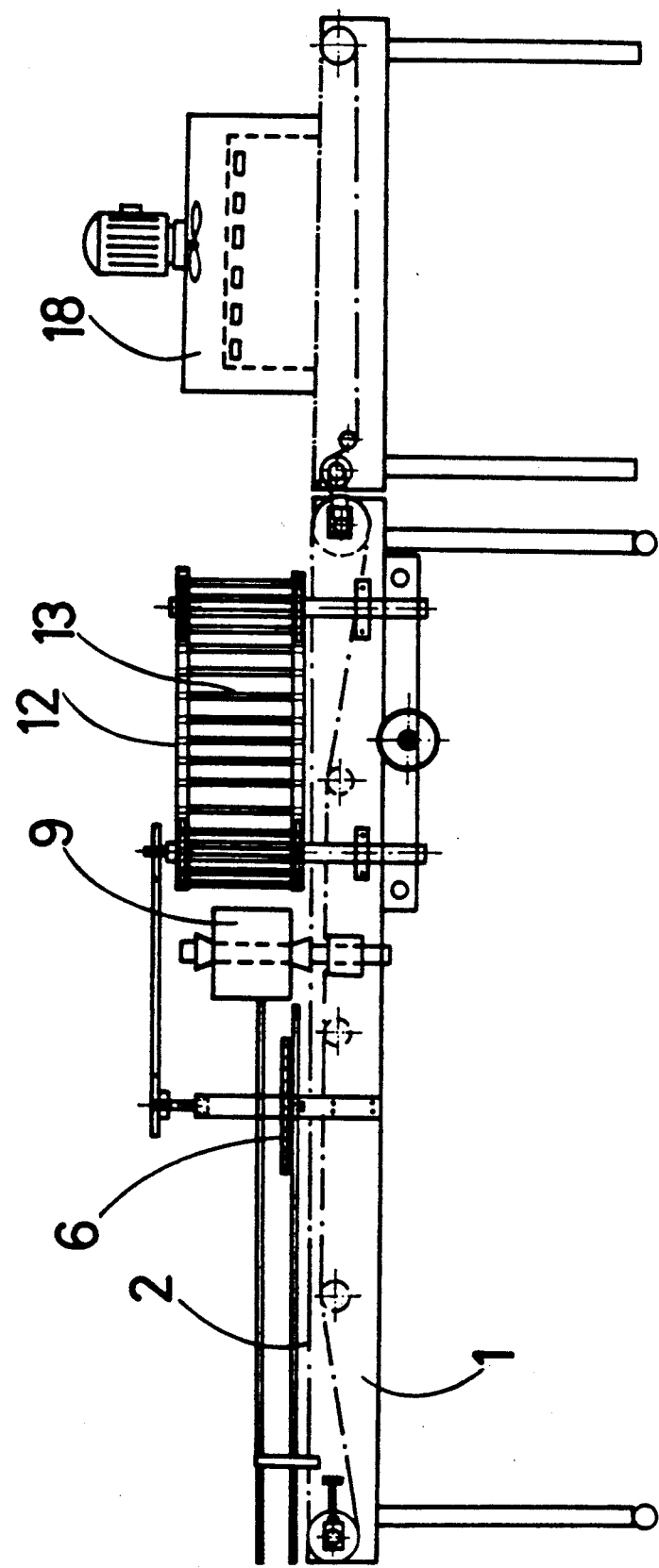
FIG. 2 is a side elevation view of the machine according to FIG. 1.

Referring to the figures, it can be seen in the preferred embodiment some components of the machines designed for packaging objects, particularly containers or promotional objects of the type comprising a supporting frame designated -1- supporting the machine components such as the motor, drives and other components designed for product conveyance, selecting means of said products and the promotional wrapping or strip shaping means.

Feeding and conveying means for the different products and/or container to be joined consist of a conveying belt -2- with tracks -3- and -21- thereon, these tracks move toward a selecting means of each product -4- and -5- so as to setup container groupings therefrom and said means comprising a vertically disposed star wheel -6- having synchronized rotation with the endless belt -2-.

The star wheel -6- places the product container groups -4- -5- in a further track -7- made up with two angle-shaped lengths, of which extends between the reels -8- and -9- which are used to store and feed the laminar material -10-.

The reels -8- and -9- are vertically disposed and the laminar material is unwound of the two reels and driven by conveying chain sets -11- and -12- disposed in a parallel relationship and carrying the cutting and thermowelding means -13- for directly making up the individual strip on each side of the products -4- -5- grouped in a promotional package.

Track -7- associated with the endless belt -2- leads the products -4- -5-, packaged and with the strips already cut to size towards a heating tunnel -18- for a further retractilating treatment of the already produced strips.

Reference numeral -14- shows a rotor numerals -15- and -16- the driving elements for the motion of the belt -2- and numeral -17- is a sending-back device, with one of the angle arms -19- and -20- of the driving chains -11- -12- connected to the synchronized star -6-.

I claim:

1. Apparatus for combining articles in the form of a package, such as a plurality of containers, comprising: a frame having a driven conveying belt, said conveying belt forming a horizontal platform for supplying said container articles, a pair of tracks disposed above said conveying belt for directing and feeding at least two container articles to about a center zone of said conveying belt, rotatable wheel means having a plurality of cavities disposed above said conveying belt for feeding said two container articles in an alternating in line fashion to an opening in a third track disposed above said conveying belt and downstream of said pair of tracks; said third track comprising substantially two straight portions extending from about a side edge area of said conveying belt to a central area of said conveying belt; oppositely disposed reel means for supplying tape material in the form of endless strips to opposite sides of said container articles; and thermowelding means for applying said strips of tape material to opposite sides of said container articles and for cutting said strips of tape material, such that at least two container articles are united in a packaged format.

2. The apparatus according to claim 1, further including heating means downstream of said means applying said strips of tape material to the opposite sides of said container articles for the further treatment of the strips of tape material applied to said articles packaged by said apparatus.

3. The apparatus according to claim 1, wherein said means for applying and cutting said strips of tape material to opposite sides of said container articles comprise a plurality of thermowelding and cutting means mounted on oppositely disposed endless conveying means for applying said strips of said tape material to the opposite sides of said container articles and cutting said strips, whereby said two container articles are packaged in a combined format.

4. The apparatus according to claim 1, wherein said container articles are of different sizes.

5. The apparatus according to claim 1, wherein said container articles are of different shapes.

6. The apparatus according to claim 1, wherein said pair of tracks substantially converge at a point near said wheel means, and said wheel means being synchronized with the speed of said conveying belt for grouping in line in an alternate manner said container articles, while said wheel means is rotating towards said opening of said third track.

7. The apparatus according to claim 6, wherein said opening of said third track is at said side edge area.

8. The apparatus according to claim 3, wherein one of said straight portions of said third track is discontinuous and is disposed at opposite ends of said oppositely disposed endless conveying means for directing and feeding said at least two container articles to a work zone between said oppositely disposed endless conveying means, and for leading said packaged articles away from said work zone.

9. The apparatus according to claim 8, wherein one of said straight portions of said third track disposed downstream of said oppositely disposed endless conveying means leads said packaged articles to heating means disposed downstream of said means applying said strips of tape material to the opposite sides of said container articles.

* * * * *